(12) United States Patent
LaVen et al.

(10) Patent No.: US 8,277,997 B2
(45) Date of Patent: Oct. 2, 2012

(54) SHARED VARIABLE-BASED FUEL CELL SYSTEM CONTROL

(75) Inventors: Arne LaVen, Bend, OR (US); Mesa Scharf, Bend, OR (US)

(73) Assignee: Idatech, LLC, Bend, OR (US)

( * ) Notice: Subject to any disclaimer, the term of this patent is extended or adjusted under 35 U.S.C. 154(b) by 1402 days.

(21) Appl. No.: 10/909,266

(22) Filed: Jul. 29, 2004

(65) Prior Publication Data

US 2006/0024540 A1    Feb. 2, 2006

(51) Int. Cl.
*H01M 8/04* (2006.01)
(52) U.S. Cl. ......... 429/446; 429/428; 429/443; 429/444
(58) Field of Classification Search .............. 429/12–46, 429/444
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,765,946 A | 10/1973 | Werner et al. |
| 3,857,735 A | 12/1974 | Louis et al. |
| 3,877,989 A | 4/1975 | Waldman et al. |
| 3,920,416 A | 11/1975 | Houseman |
| 3,955,941 A | 5/1976 | Houseman et al. |
| 3,982,910 A | 9/1976 | Houseman et al. |
| 4,000,003 A | 12/1976 | Baker et al. |
| 4,003,343 A | 1/1977 | Lee |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,349,613 A | 9/1982 | Winsel |
| 4,351,405 A | 9/1982 | Fields et al. |

(Continued)

FOREIGN PATENT DOCUMENTS

EP        0828303        3/1998
(Continued)

OTHER PUBLICATIONS

English-language abstract of Japanese Patent No. 4-163860, Jun. 1992.

(Continued)

*Primary Examiner* — Barbara Gilliam
*Assistant Examiner* — Steven Scully
(74) *Attorney, Agent, or Firm* — Dascenzo Intellectual Property Law, P.C.

(57) ABSTRACT

Fuel cell systems and methods for controlling the operation of fuel cell assemblies included therein. In some embodiments, the fuel cell assemblies include a fuel processor and a fuel cell stack, and the fuel cell system includes a control system that controls the operation thereof based upon at least one variable associated therewith. In some embodiments, the variable is associated with the hydrogen (or other product) stream from the fuel processor. In some embodiments, the variable is the pressure of this stream. In some embodiments, the control system controls the operation of the fuel cell system to maintain the pressure of the hydrogen stream within one or more threshold values. In some embodiments, the control system controls the operation of the fuel cell system to maintain the pressure of the hydrogen stream within selected threshold values and to maintain the fuel cell stack's output voltage above a selected threshold.

18 Claims, 3 Drawing Sheets

U.S. PATENT DOCUMENTS

| | | |
|---|---|---|
| 4,377,445 A | 3/1983 | Grimes |
| 4,387,434 A | 6/1983 | Moncrief, Jr. et al. |
| 4,390,602 A | 6/1983 | Struthers |
| 4,444,158 A | 4/1984 | Yoon |
| 4,468,235 A | 8/1984 | Hill |
| 4,472,176 A | 9/1984 | Rubin |
| 4,473,622 A | 9/1984 | Chludzinski et al. |
| 4,533,607 A | 8/1985 | Sederquist |
| 4,553,981 A | 11/1985 | Fuderer |
| 4,567,857 A | 2/1986 | Houseman et al. |
| 4,642,273 A | 2/1987 | Sasaki |
| 4,657,828 A | 4/1987 | Tajima |
| 4,781,241 A | 11/1988 | Misage et al. |
| 4,788,004 A | 11/1988 | Pinto et al. |
| 4,820,594 A | 4/1989 | Sugita et al. |
| 4,839,574 A | 6/1989 | Takabayashi |
| 4,883,724 A | 11/1989 | Yamamoto |
| 4,904,548 A | 2/1990 | Tajima |
| 4,946,667 A | 8/1990 | Beshty |
| 4,981,676 A | 1/1991 | Minet et al. |
| 4,988,283 A | 1/1991 | Nagasawa et al. |
| 5,006,846 A | 4/1991 | Granville et al. |
| 5,030,661 A | 7/1991 | Lywood |
| 5,139,894 A | 8/1992 | Mizuno et al. |
| 5,154,986 A | 10/1992 | Takechi et al. |
| 5,200,278 A | 4/1993 | Watkins |
| 5,229,222 A | 7/1993 | Tsutsumi et al. |
| 5,334,463 A | 8/1994 | Tajima et al. |
| 5,354,547 A | 10/1994 | Rao et al. |
| 5,366,818 A | 11/1994 | Wilkinson et al. |
| 5,366,821 A | 11/1994 | Merritt et al. |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,462,815 A | 10/1995 | Horiuchi |
| 5,478,662 A | 12/1995 | Strasser |
| 5,509,942 A | 4/1996 | Dodge |
| 5,527,632 A | 6/1996 | Gardner |
| 5,624,768 A | 4/1997 | Tanokura |
| 5,631,532 A | 5/1997 | Azuma et al. |
| 5,631,820 A | 5/1997 | Donnelly et al. |
| 5,637,414 A | 6/1997 | Inoue et al. |
| 5,658,681 A | 8/1997 | Sato et al. |
| 5,677,073 A | 10/1997 | Kawatsu |
| 5,705,916 A | 1/1998 | Rudbeck et al. |
| 5,712,052 A | 1/1998 | Kawatsu |
| 5,714,276 A | 2/1998 | Okamoto |
| 5,763,113 A | 6/1998 | Meltser et al. |
| 5,771,476 A | 6/1998 | Mufford et al. |
| 5,780,179 A | 7/1998 | Okamoto |
| 5,795,666 A | 8/1998 | Johnssen |
| 5,798,186 A | 8/1998 | Fletcher et al. |
| 5,821,185 A | 10/1998 | White et al. |
| 5,846,669 A | 12/1998 | Smotkin et al. |
| 5,861,137 A | 1/1999 | Edlund |
| RE36,148 E | 3/1999 | Strasser |
| 5,897,766 A | 4/1999 | Kawatsu |
| 5,897,970 A | 4/1999 | Isomura et al. |
| 5,927,416 A | 7/1999 | del Re et al. |
| 5,929,538 A | 7/1999 | O'Sullivan et al. |
| 5,932,181 A | 8/1999 | Kim et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,001,499 A | 12/1999 | Grot et al. |
| 6,007,931 A | 12/1999 | Fuller et al. |
| 6,013,385 A | 1/2000 | DuBose |
| 6,022,634 A | 2/2000 | Ramunni et al. |
| 6,042,956 A | 3/2000 | Lenel |
| 6,045,772 A | 4/2000 | Szydlowski et al. |
| 6,045,933 A | 4/2000 | Okamoto |
| 6,051,192 A | 4/2000 | Maston et al. |
| 6,054,229 A | 4/2000 | Hsu et al. |
| 6,083,637 A | 7/2000 | Walz et al. |
| 6,096,449 A | 8/2000 | Fuglevand et al. |
| 6,103,410 A | 8/2000 | Fuller et al. |
| 6,120,923 A | 9/2000 | Van Dine et al. |
| 6,165,633 A | 12/2000 | Negishi |
| 6,171,574 B1 | 1/2001 | Juda et al. |
| 6,214,484 B1 | 4/2001 | Hauer |
| 6,221,117 B1 | 4/2001 | Edlund et al. |
| 6,242,120 B1 | 6/2001 | Herron |
| 6,245,214 B1 | 6/2001 | Rehg et al. |
| 6,342,316 B1 * | 1/2002 | Okamoto et al. ............ 429/424 |
| 6,348,278 B1 | 2/2002 | LaPierre et al. |
| 6,383,670 B1 | 5/2002 | Edlund et al. |
| 6,421,593 B1 | 7/2002 | Kempen et al. |
| 6,451,464 B1 | 9/2002 | Edlund et al. |
| 6,458,477 B1 | 10/2002 | Hsu |
| 6,495,277 B1 | 12/2002 | Edlund et al. |
| 6,522,955 B1 | 2/2003 | Colborn |
| 6,537,690 B1 | 3/2003 | Karrupaiah et al. |
| 6,555,989 B1 * | 4/2003 | Pearson ........................ 320/101 |
| 6,864,003 B2 | 3/2005 | Ueda et al. |
| 2001/0014415 A1 * | 8/2001 | Iio et al. ........................ 429/22 |
| 2001/0049038 A1 | 12/2001 | Dickman et al. |
| 2002/0020623 A1 | 2/2002 | Speranza et al. |
| 2002/0102447 A1 | 8/2002 | Kato |
| 2002/0127447 A1 | 9/2002 | Edlund et al. |
| 2003/0022034 A1 * | 1/2003 | Suzuki ........................... 429/13 |
| 2003/0113601 A1 | 6/2003 | Edlund et al. |
| 2004/0080297 A1 * | 4/2004 | Leboe .......................... 320/101 |
| 2005/0119842 A1 | 6/2005 | Clingerman et al. |

FOREIGN PATENT DOCUMENTS

| | | |
|---|---|---|
| EP | 1065741 A2 | 1/2001 |
| JP | 02086069 | 3/1990 |
| JP | 4-163860 | 6/1992 |
| JP | 2000067894 | 3/2000 |
| JP | 2002246051 | 8/2002 |
| WO | WO 99/65097 | 12/1999 |
| WO | WO 00/02282 | 1/2000 |
| WO | WO 00/04600 | 1/2000 |

OTHER PUBLICATIONS

English-language abstract of Japanese Patent No. 6176779, 1994.
English-language abstract of Japanese Patent No. 7057758, 1995.
English-language abstract of German language PCT Patent Publication No. WO 97/43796, 1997.
English-language abstract of Japanese Patent No. 11116202, 1999.
English-language abstract of Japanese Patent No. 2-168803, 1999.
English-language abstract of Japanese Patent No. 63-236269, 1999.
English-language abstract of German language PCT Patent Application Serial No. WO 00/04600, 2000.
Edlund, David J. and William A. Pledger, "The Practical Use of Metal-Membrane Reactors for Industrial Applications," The 1995 Membrane Technology Reviews, pp. 89-97 (Nov. 1994).
Nadal, M. et al., "Development of a Hybrid Fuel Cell/Battery Powered Electric Vehicle," International Journal of Hydrogen Energy, vol. 21, No. 6, pp. 497-505, Jun. 1, 1996.
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nove. 17-20, 1996 in Orlando, Florida, pp. 206-209.
English-language abstract of Japanese Patent Publication No. H10-083824, Mar. 31, 1998.
English-language abstract of Japanese Patent Publication No. 2002-231286, Aug. 16, 2002.

* cited by examiner

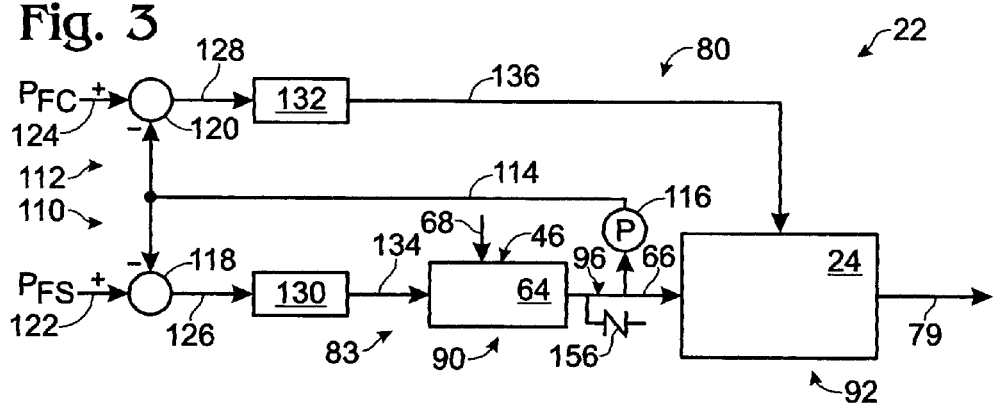
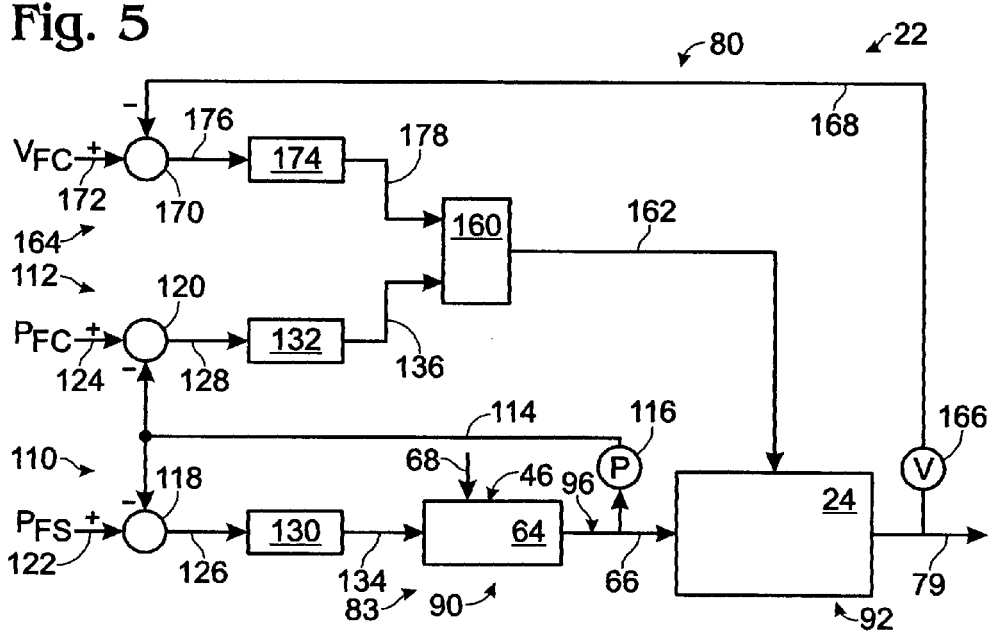
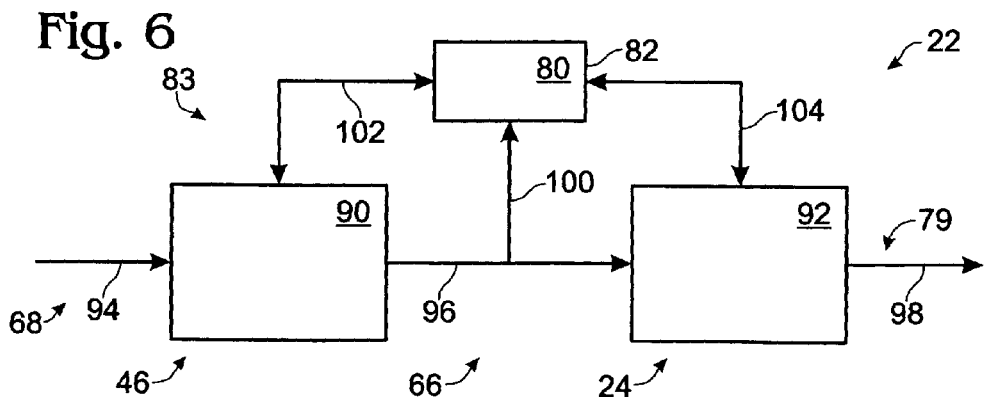

SHARED VARIABLE-BASED FUEL CELL SYSTEM CONTROL

TECHNICAL FIELD

The present disclosure relates generally to fuel cell systems, and more particularly to fuel cell systems and methods for operating fuel cell systems.

BACKGROUND OF THE DISCLOSURE

An electrochemical fuel cell is a device that converts fuel and an oxidant to electricity, a reaction product, and heat. For example, fuel cells may be adapted to convert hydrogen and oxygen into water and electricity. In such fuel cells, the hydrogen is the fuel, the oxygen is the oxidant, and the water is the reaction product.

A fuel cell stack is one or more fuel cells, including groups of fuel cells, coupled together as a unit. A fuel cell stack may be incorporated into a fuel cell system. A fuel cell system also typically includes a fuel source, such as a supply of fuel and/or a fuel processor that generates and/or purifies a fuel stream, such as a hydrogen gas stream, for the fuel cell stack. An example of a fuel processor is a steam reformer. A fuel cell system may also include a battery bank, which may store the electrical output of the fuel cell stack, and an air source, which delivers oxygen to the fuel cell, and in some embodiments to the fuel processor. A need exists to control fuel cell stacks and other fuel cell system components to regulate the operation of the system, such as to prevent damage to the system and/or to operate the system efficiently in response to applied loads.

SUMMARY OF THE DISCLOSURE

The present disclosure relates to fuel cell systems and methods for controlling the operation of fuel cell assemblies included in fuel cell systems. In some embodiments, the fuel cell assemblies include a fuel processor and a fuel cell stack. The fuel cell system includes a control system with a controller adapted to control the operation of the fuel cell assemblies based upon at least one variable associated therewith. In some embodiments, the variable is associated with the product hydrogen (or other fuel) stream of the fuel processor, and in some embodiments, the variable is the pressure of this stream. In some embodiments, the control system (and/or controller) is adapted to control the operation of the fuel cell system to maintain the pressure of the hydrogen stream within one or more selected threshold values. In some embodiments, the control system (and/or controller) is adapted to control the operation of the fuel cell system to maintain the pressure of the hydrogen (or other fuel stream) within selected threshold values and to maintain the output voltage from the fuel cell stack above a selected threshold.

BRIEF DESCRIPTION OF THE DRAWINGS

FIG. 3 is a schematic view of another example of a fuel cell system that includes a fuel cell stack, a fuel source, and a control system.

FIG. 5 is a schematic view of an example of a fuel cell system as in FIG. 3, and further including a control system adapted to control the operation of the system based at least in part on the fuel cell output voltage.

FIG. 6 is a general schematic view of an example of a fuel cell system having two functional components and a controller.

DETAILED DESCRIPTION AND BEST MODE OF THE DISCLOSURE

The present disclosure presents various fuel cell systems, controllers for these systems, and methods for controlling the operation thereof. As used herein, a fuel cell stack includes one or more fuel cells, whether individually or in groups of fuel cells. As used herein, a fuel cell system includes at least a fuel cell stack and a fuel source, with the fuel cell stack being adapted to produce an electric current from an oxidant and from fuel from the fuel source. As used herein, an energy producing and consuming assembly includes one or more fuel cell stacks, at least one fuel source for the fuel cell stack(s), and at least one energy-consuming device adapted to exert an applied load on the fuel cell system.

Figure 1:
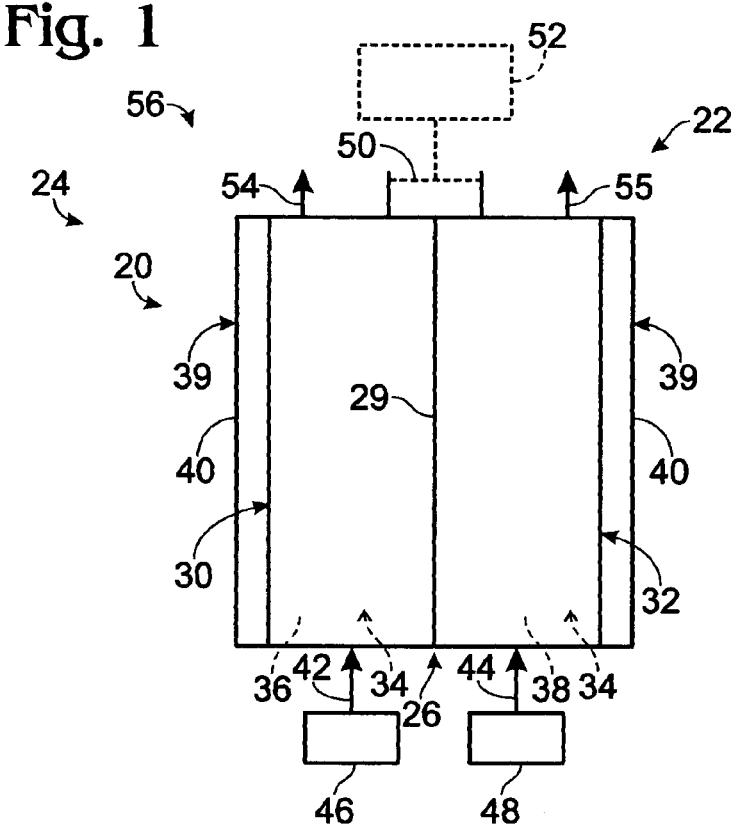
FIG. 1 is a schematic view of an illustrative example of a fuel cell, such as may form part of a fuel cell system according to the present disclosure.

The subsequently discussed fuel cell stacks, assemblies and systems are compatible with a variety of different types of fuel cells, such as proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 1. The fuel cell may be described as forming a portion of a fuel cell system, such as generally indicated at 22, and/or a portion of a fuel cell stack, such as generally indicated at 24. Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cell 20 carry the relative voltage potential produced by the fuel cell.

In operation, fuel 42 is fed to the anode region, while oxidant 44 is fed to the cathode region. Fuel 42 may also be referred to as supply fuel 42. A typical, but not exclusive, fuel for cell 20 is hydrogen, and a typical, but not exclusive, oxidant is oxygen. As used herein, hydrogen refers to hydrogen gas and oxygen refers to oxygen gas. The following discussion will refer to fuel 42 as hydrogen 42 and oxidant 44 as oxygen 44, although it is within the scope of the present disclosure that other fuels and/or oxidants may be used. Hydrogen 42 and oxygen 44 may be delivered to the respective regions of the fuel cell via any suitable mechanism from respective sources 46 and 48. Illustrative examples of suitable fuel sources 46 for hydrogen 42 include at least one pressurized tank, hydride bed or other suitable hydrogen storage device, and/or a fuel processor that produces a stream containing hydrogen gas. Illustrative examples of suitable sources 48 of oxygen 44 include a pressurized tank of oxygen or air, or a fan, compressor, blower or other device for directing air to the cathode region.

Hydrogen and oxygen typically combine with one another via an oxidation-reduction reaction. Although membrane 28 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 1.

In practice, a fuel cell stack contains a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device, the fuel cell system itself, etc.

At least one energy-consuming device 52 may be electrically coupled to the fuel cell system, such as to the fuel cell stack and/or one or more batteries associated with the stack. Device 52 applies a load to the fuel cell system and draws an electric current from the system to satisfy the load. This load may be referred to as an applied load, and may include thermal and/or electrical load(s). Illustrative examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, batteries and even the balance-of-plant electrical requirements for the fuel cell system of which stack 24 forms a part. An energy producing and consuming assembly, which is illustrated generally in FIG. 1 at 56, includes at least one fuel cell system 22 and at least one energy-consuming device 52 adapted to exert an applied load to, or upon, the fuel cell system.

In cathode region 32, electrons from the external circuit and protons from the membrane combine with oxygen to produce water and heat. Also shown in FIG. 1 are an anode purge or discharge stream 54, which may contain hydrogen gas, and a cathode air exhaust stream 55, which is typically at least partially, if not substantially, depleted of oxygen. It should be understood that fuel cell stack 24 will typically have a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

Figure 2:
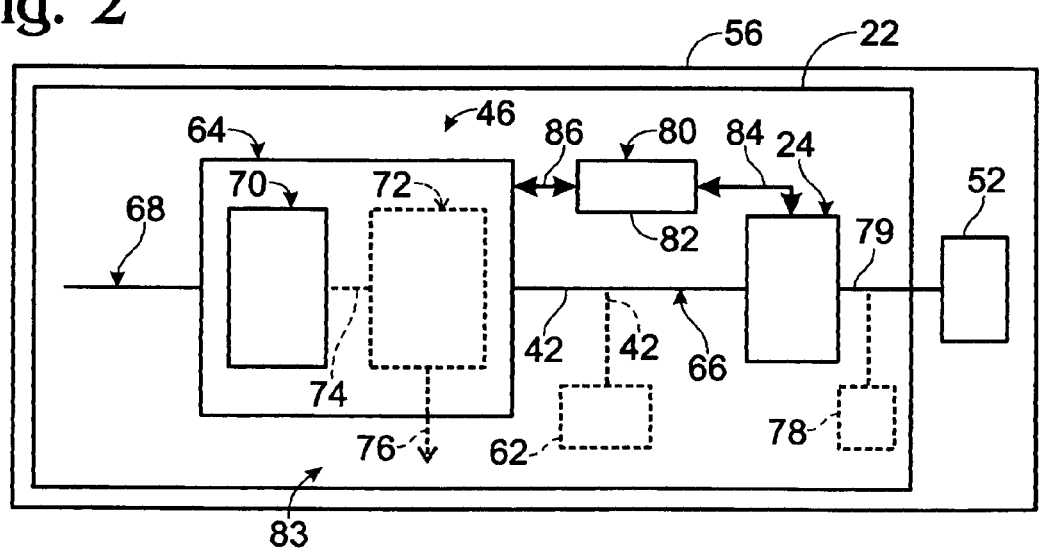
FIG. 2 is a schematic view of an illustrative example of a fuel cell system including a fuel cell stack, a fuel source, and a control system.

As discussed above, many fuel cell stacks utilize hydrogen gas as a reactant, or fuel. Therefore, a fuel cell stack 24 may be coupled with a source 46 of hydrogen gas 42 (and related delivery systems and balance-of-plant components) to form a fuel cell system 22. An illustrative example of a fuel cell system is schematically illustrated in FIG. 2. As discussed previously with respect to FIG. 1, examples of sources 46 of hydrogen gas 42 include a storage device 62 that contains a stored supply of hydrogen gas, as indicated in dashed lines in FIG. 2. Examples of suitable storage devices 62 include pressurized tanks and hydride beds. An additional or alternative source 46 of hydrogen gas 42 is the product, or fuel, stream from a fuel processor, which produces hydrogen by reacting a feed stream to produce the stream containing hydrogen gas 42 or to produce reaction products from which the stream containing hydrogen gas 42 is formed, such as after one or more separation or purification steps. As shown in solid lines in FIG. 2, system 22 includes at least one fuel processor 64 and at least one fuel cell stack 24. Fuel processor 64 is adapted to produce a product hydrogen (fuel) stream 66 containing hydrogen gas 42 from a feed stream 68 containing one or more feedstocks. The fuel cell stack is adapted to produce an electric current from the portion of product hydrogen stream 66 delivered thereto.

In the illustrated example, a single fuel processor 64 and a single fuel cell stack 24 are shown; however, more than one of either or both of these components may be used. These components have been schematically illustrated and the fuel cell system may include additional components that are not specifically illustrated in the figures, such as air delivery systems, heat exchangers, sensors, flow-regulating devices, heating assemblies and the like. As also shown, hydrogen gas may be delivered to stack 24 from one or more of fuel processor 64 and storage device 62, and hydrogen from the fuel processor may be delivered to one or more of the storage device and stack 24. Some or all of stream 66 may additionally, or alternatively, be delivered, via a suitable conduit, for use in another hydrogen-consuming process, burned for fuel or heat, or stored for later use.

Fuel processor 64 includes any suitable device(s) and/or structure(s) that are configured to produce hydrogen gas from the feed stream. Accordingly, fuel processor 64 may be described as including a hydrogen-producing region 70 in which a stream that is at least substantially comprised of hydrogen gas is produced from a feed stream. Illustrative examples of suitable mechanisms for producing hydrogen gas from feed stream 68 include steam reforming and autothermal reforming, in which reforming catalysts are used to produce hydrogen gas from a feed stream containing water and at least one carbon-containing feedstock. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Illustrative examples of suitable carbon-containing feedstocks include at least one hydrocarbon or alcohol. Illustrative examples of suitable hydrocarbons include methane, propane, natural gas, diesel, kerosene, gasoline and the like. Illustrative examples of suitable alcohols include methanol, ethanol, and polyols, such as ethylene glycol and propylene glycol.

Feed stream 68 may be delivered to fuel processor 64 via any suitable mechanism and/or via any suitable feedstock delivery system. Although only a single feed stream 68 is shown in FIG. 2, more than one stream 68 may be used and these streams may contain the same or different feedstocks. As used herein, the term "fuel processing assembly" may be used to refer to the fuel processor and associated components of the fuel cell system, such as feedstock delivery systems, heating assemblies, separation regions or devices, air delivery systems, fuel delivery systems, fluid conduits, heat exchangers, fuel processor controllers, etc. All of these illustrative components are not required to be included in any fuel processing assembly or used with any fuel processor according to the present disclosure. Similarly, other components may be included or used.

In many applications, it is desirable for the fuel processor to produce at least substantially pure hydrogen gas. Accordingly, the fuel processor may utilize a process that inherently produces sufficiently pure hydrogen gas. Alternatively, the fuel processing assembly and/or the fuel processor may include one or more suitable purification and/or separation devices that remove impurities from the hydrogen gas produced in the fuel processor. When region 70 does not produce pure (or sufficiently pure) hydrogen gas, stream 66 may include one or more of such illustrative impurities as carbon monoxide, carbon dioxide, water, methane, and unreacted feedstock. As another example, the fuel processing system or fuel cell system may include one or more purification and/or separation devices downstream from the fuel processor. This is schematically illustrated in FIG. 2, in which a separation region 72 is shown in dashed lines. When fuel processor 64 includes a separation region 72, the hydrogen-producing region may be described as producing a mixed gas stream that includes hydrogen gas and other gases. Similarly, many suitable separation regions will produce from this mixed gas stream at least one product or fuel stream, such as stream 66, that contains at least substantially pure hydrogen gas and at least one byproduct stream that contains at least a substantial portion of the other gases. A mixed gas stream and a byproduct stream are schematically illustrated in FIG. 2 at 74 and 76, respectively. The separation region, or regions, may be housed with the hydrogen-producing region within a common shell, attached to the fuel processor, or separately positioned from the fuel processor (but still in fluid communication therewith).

Separation region 72 may utilize any suitable process or mechanism for increasing the purity of the hydrogen gas and/or decreasing the concentration of one or more other gases (such as carbon monoxide and/or carbon dioxide) that may be mixed in with hydrogen gas. Illustrative examples of suitable processes include one or more of chemical separation processes, in which one or more of the other gases are selectively adsorbed or reacted and thereby separated from the hydrogen gas, and physical separation processes, in which a physical barrier is used to selectively divide the mixed gas stream into the at least one product and byproduct streams. Examples of suitable physical separation processes include pressure-driven separation processes, in which the mixed gas stream is delivered into contact with suitable separation structure under pressure, with the pressure differential between the mixed gas region and at least one permeate or product region of the separation structure driving the separation process.

An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions (to produce hydrogen gas carbon dioxide from water and carbon dioxide).

Non-exclusive examples of suitable pressure-driven separation processes include the use of one or more hydrogen-selective membranes and the use of a pressure swing adsorption system. Illustrative examples of suitable hydrogen-selective membranes include membranes formed from palladium or palladium alloys, such as alloys of palladium and copper or silver. The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membranes may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents. An example of a suitable structure for use in separation region 72 is a membrane module, which contains one or more hydrogen permeable membranes. Examples of suitable hydrogen-selective membranes, methods for forming and utilizing the membranes, and separation devices that include one or more hydrogen-selective membranes are disclosed in U.S. Pat. Nos. 6,319,306, 6,537,352 and 6,562,111, the complete disclosures of which are hereby incorporated by reference for all purposes.

Another example of a suitable pressure-separation process for use in separation region 72 is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from the mixed gas stream.

In the context of a fuel cell system, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Illustrative, nonexclusive examples of suitable fuel processors are disclosed in U.S. Pat. Nos. 6,221,117, 5,997,594, 5,861,137, and pending U.S. Patent Application Publication No. 2001/0045061. The complete disclosures of the above-identified patents and patent application are hereby incorporated by reference for all purposes.

Illustrative examples of modes of operation for a fuel processor include start-up, shutdown, idle, running (active, hydrogen-producing), and off. In the off operating state, the fuel processor is not producing hydrogen gas and is not being maintained at suitable operating conditions to produce hydrogen gas. For example, the fuel processor may not be receiving any feed streams, may not be heated, etc. In the start-up operating state, the fuel processor is transitioning from the off state to its running operating state, in which the fuel processor is at its desired operating parameters for producing hydrogen gas, is receiving feedstock(s) and producing more than a nominal flow of hydrogen gas therefrom for delivery to the fuel cell stack and/or hydrogen-storage device. Accordingly, in the start-up state, the fuel processor is being brought to the desired operating conditions, such as temperature and pressure, for producing hydrogen gas. For example, fuel processors in the form of steam reformers typically operate at temperatures in the range of 200° C. and 800° C., and at pressures in the range of 50 psi and 1000 psi, although temperatures and pressures outside of these ranges are within the scope of the disclosure, such as depending upon the particular type and configuration of fuel processor being used.

In the standby, or idle, operating state, the fuel processor is not producing any hydrogen gas, or only a nominal flow of hydrogen gas, with this flow typically not being delivered to the fuel cell stack or hydrogen-storage device. Instead, any produced hydrogen gas (or other output stream) is typically vented or utilized as a combustible fuel in a burner or other heating assembly. However, in the idle operating state, the fuel processor is typically maintained at the desired operating parameters for producing hydrogen gas, such as upon delivery of the appropriate feed stream(s), whereupon the fuel processor may be returned to its running operating state. It is within the scope of the present disclosure that, in the idle operating state, the above-discussed nominal flow of hydrogen, when present, is sufficient to produce enough electric current to power the fuel cell system and/or recharge the system's energy-storage device. In the shutdown operating state, the fuel processor is transitioning to its off operating state, such as from its running or idle operating states. It is not required by this disclosure for a fuel processor to be selectively configured to each of these operating states, or modes of operation. Similarly, a fuel processor may be configured for other operating states, and/or differently configured operating states without departing from the scope of the present disclosure.

FIG. 2 also schematically depicts that fuel cell system 22 may (but are not required to) include at least one energy-storage device 78. Device 78 is adapted to store at least a portion of the electrical output, or power, 79 from by fuel cell stack 24. For a constant output voltage, such as 24 volts, the output power may be determined by measuring the output current. The electrical output can also be used to satisfy an applied load, such as from energy-consuming device 52 and/or fuel cell system 22. Energy-consuming device 52 may be adapted to apply its load to one or more of stack 24 and energy-storage device 78. An illustrative example of a suitable energy-storage device 78 is a battery, but others may be used. Device 78 may additionally or alternatively be used to power the fuel cell system during start-up of the system.

Also shown in FIG. 2 is a control system 80 with a controller 82 that is adapted to control the operation of one or both of the fuel cell stack 24 and the fuel source 46. As used herein, the components of fuel cell system 22 other than control system 80, such as the fuel source 46 and the fuel cell stack 24, may be generally referred to as a fuel cell assembly 83. The performance of system 22 may be regulated and/or automatically adjusted in response to operating variables and/or changes thereto, detected by control system 80.

Controller 82 may be implemented as a discrete unit. It may also be implemented as separate components, such as a controller for the fuel cell stack and a controller for the fuel source. Such separate controllers, then, can communicate with each other via appropriate communication linkages. Control system 80 may include one or more analog or digital circuits, logic units or processors for operating programs stored as software in memory, and, as has been mentioned, may include one or more discrete units in communication with each other. The controller(s) may have functionality in addition to those described herein. For example, a controller may be adapted to control and/or monitor aspects of the fuel cell assembly other than those described herein.

In the example shown in FIG. 2, controller 82 communicates with fuel cell stack 24 and fuel source 46 via appropriate communication linkages 84 and 86, respectively. Other linkages also may be used. For example there may be linkages to oxygen source 48, to energy-storage device 78, to feedstock sources and/or delivery systems for fuel processor 64, etc. Linkages 84 and 86 enable at least one-way communication with the controller. Preferably, the linkages enable two-way communication with the controller, thereby enabling the controller to measure or monitor selected values, or selected variables, of stack 24 and source 46, while also controlling the operation of these units, typically responsive at least in part to the measured values. The linkages may include any suitable interface, actuator and/or sensor for effecting the desired monitoring and control.

Control system 80 also may include and/or communicate with sensors, switches, feedback mechanisms, other electrical and/or mechanical circuits, and the like. Illustrative examples of variables associated with fuel cell stack 24 that may be measured or otherwise detected include stack current, stack voltage, applied load, stack temperature, water conductivity, and air flow. Other examples of variables that may be monitored or otherwise detected that are associated with a fuel source 46 in the form of a fuel processor 64 include the mode of operation of the fuel processor, the supply of feedstock, the composition of the feedstock, the rate of delivery of the feedstock, the rate at which hydrogen gas is being produced, the operating temperature and/or pressure, the temperature, composition and/or pressure of the produced hydrogen, and the stoichiometry of the chemical process for producing fuel. An illustrative example of a monitored variable associated with the air source is the rate at which air is being supplied to the fuel processing assembly and the fuel cell stack. When oxygen source 48 is incorporated into either or both of the fuel source and/or fuel cell stack, its operation and measurement will typically be incorporated into the corresponding linkage for the unit into which it is incorporated. Not all of these variables are necessarily essential, and other variables may be measured as well, depending on the particular requirements and configuration of the fuel cell system, the complexity of the system and the desired level of control, and particular user preferences.

By "associated with," it is meant that the control system (and/or controller) is adapted to measure, calculate, or otherwise detect, directly or indirectly, the variable (in this example the pressure) of the corresponding stream or component (in this example the hydrogen fuel stream). The value of the measured variable may be directly inputted to the control system. However, it is within the scope of the present disclosure that the control system (and/or controller) is adapted to receive an input that is representative of, or derived from, the measured value of the variable, such as a digital representation thereof, an error signal indicative of the value of the variable based upon a threshold or prior value thereof, a normalized or scaled value of the measured variable, etc. Control system 80 also may include and/or communicate with sensors, switches, feedback mechanisms, other electrical and/or mechanical circuits, and the like. As discussed in more detail herein, the controller may be adapted to control the operation of at least a pair of functional components of the fuel cell system, such as the operation of the fuel processor and the fuel cell stack responsive (at least in part) to a common variable, such as a variable associated with the hydrogen stream. As used herein, the "common variable," may also be referred to as a shared variable or a mutual variable. An illustrative (non-exclusive) example of such a variable is the pressure of the hydrogen (or other fuel) stream 66 that is produced by the fuel processor and consumed by the fuel cell stack.

In the illustrated example, control system 80 is adapted to control the operation of the fuel cell system, including fuel processor 64 and fuel cell stack 24 based at least in part upon a variable that is common, or associated with, both processor 64 and stack 24. More particularly, control system 80 is adapted to control, responsive at least in part upon inputs associated with the value of a common variable, the operating states of the fuel processor and the fuel cell stack. This control is intended to be more than simply shutting down or starting up the system responsive to a variable value that exceeds a particular threshold. While this operation is within the scope of the present disclosure, control system 80 is adapted to monitor a common variable and maintain the fuel cell system in an active operating state, in which the fuel processor is producing fuel (such as hydrogen gas) and the fuel cell stack is receiving the fuel and an oxidant and producing an electric current, such as to satisfy an applied load, therefrom. For example, the control system may be adapted to regulate the active operating state of the fuel processor and the fuel cell stack to maintain the fuel cell system in an active operating state based at least in part upon the measured value representative of the common variable. As such, this control may include one or more of limiting the applied load to the fuel cell system and regulating the rate of production of hydrogen gas (or other fuel) to maintain the value of the variable within a selected range of values and thereby maintain the fuel cell system in an active operating state. In such an embodiment, the control system (and/or controller) may be described as controlling the operation of the fuel cell system to maintain the pressure of the hydrogen (or other fuel stream) within selected threshold values.

As used herein, when control system 80 (and/or controller 82) is described as controlling the operating or operating state of the fuel processor or the fuel cell stack, this control may be and/or include controlling the operation of components of the fuel processing assembly (fuel processor and/or components associated with the fuel processor) or fuel cell assembly (fuel cell stack and/or components associated with the fuel cell stack). As an illustrative example, the operation of the fuel processor may be controlled by regulating one or more of the rate at which a carbon-containing or other feedstock is delivered to the fuel processor (such as by controlling the operation of a feedstock delivery system adapted to deliver the feedstock to the fuel processor), the operating of a burner or other heating assembly adapted to heat the fuel processor, the pressure of the fuel processor, etc. As a related example, the operation of the fuel cell stack may be controlled by regulating one or more of the flow of oxidant and/or hydrogen gas to the fuel cell stack, a cooling or other heat-exchange assembly associated with the stack, the load applied to the stack, etc.

An illustrative example of a common variable, which control system 80 may utilize to control the operation of the fuel cell system, is a variable associated with the fuel (i.e., hydrogen) stream 66 that is produced by the fuel processor and consumed by the fuel cell stack. For example, the pressure of stream 66 may be monitored, and the control system may be adapted to maintain the fuel cell system in an active operating state based upon the monitored value of this variable. For instance, the functions of hydrogen-producing region 70 and separation region 72 may both affect characteristics of mixed gas stream 74. As used herein, "based on" is meant to neither exclude nor require additional factors. Accordingly, "based on" should be construed to include "based at least in part on" one or more indicated factors, but not to require or exclude additional factors. For example, a control system that controls operation of a system component or function based on the fuel stream pressure may, but is not required to, also utilize other factors to control operation of the system component or function. The same applies to the other "based on" relationships described and/or claimed herein.

FIG. 3 illustrates an example of a fuel cell system 22, in which the functioning or operation of both fuel source 46 and fuel cell stack 24 both affect a common variable 96. In some the following illustrative examples, variable 96 is, or includes, the pressure P of hydrogen gas 42 in a fuel stream 66. As discussed, it is within the scope of the present disclosure that other variables may be utilized, including one or more of those described above. In the following example, the fuel processor and fuel cell stack may respectively be referred to as first and second components 90 and 92 that are controlled by the control system based upon the value of the common variable. As discussed in more detail herein, the fuel processor and fuel cell stack are not exclusive pairs of first and second components within the scope of the present disclosure.

As schematically illustrated in FIG. 3, control system 80 includes first and second control loops 110 and 112. Both control loops may (but are not required to) share a common sensor output line 114 that receives a signal representative of a pressure P of the fuel stream 66 from a gauge 116, or other sensor, associated with the stream. The control configuration given is shown simplistically, and can be realized or otherwise implemented in various forms. For instance, separate lines and/or sensors may be used. In some examples, sensor output line 114 may be coupled to first and second reference devices 118 and 120. Each reference device may be any appropriate circuit or logic unit adapted to generate a reference signal. Reference devices may be optional. Examples of reference devices may include adders, subtractors, comparators, difference amplifiers and the like. Reference devices 118 and 120 may receive reference signals on respective reference signal lines 122 and 124. For reference device 118, the reference signal may include a set value associated with fuel source 46, which value may be referred to as a pressure $P_{FS}$. For reference device 120, the reference signal may be a set value associated with fuel cell stack 24, which value may be referred to as a pressure $P_{FC}$. The difference between the sensed pressure signal on line 114, and the set value pressure $P_{FS}$, may be determined by device 118. The difference may then be output as an error signal on an error signal line 126. Similarly, the difference between the sensed pressure signal on line 114, and the set value for pressure $P_{FC}$, may be determined by device 120, and may be output as an error signal on an error signal line 128.

In some examples of fuel cell systems, the respective error signals may be applied to a first signal processor 130 associated with functional unit 90, and a second signal processor 132 associated with functional unit 92. These signal processors may be coupled to the associated functional units by respective control signal lines 134 and 136. Each signal processor may include any appropriate device that utilizes an input signal, representative at least in part to a controlled variable, to derive a control signal on the associated control signal line appropriate for controlling the function of the associated functional component.

An input signal may include any signal appropriate for the signal processor to use to produce a control signal. Accordingly, signal processors may include any circuits or logic units or devices that produce the desired control signals. In some examples, signal processor 130 may receive as an input an error signal and may produce a control signal that is appropriate to control the stoichiometry of fuel production by fuel processor 64 from one or more input feedstocks in feed stream(s) 68. Similarly, signal processor 132 may produce a control signal that is appropriate to control the production of electrical current, and thereby the electrical power, by fuel cell stack 24 from fuel stream 66 and an oxidant stream. This may be accomplished, for example, by applying the control signal to a load-regulating device, such as a DC/DC converter or a DC/AC inverter, For example, when the fuel stream 66 has a pressure above a threshold pressure $P_{FS}$, the controller may, through the sending of the appropriate control signal(s), direct the reduction of the production of fuel (which, as discussed, is often hydrogen gas). A reduction in fuel flow may then result in a reduction of the pressure of the fuel stream below threshold pressure $P_{FS}$, by reducing the backpressure produced by fuel cell stack 24. This decrease in fuel stream pressure, then, may result in a reduction in the error signal on error signal line 126. The threshold values referred to herein may be any predetermined or preselected values, such as may be selected for a particular embodiment of fuel cell system 22, for a particular operation or degree of control, etc.

Correspondingly, when the fuel stream 66 has a pressure below the set value $P_{FS}$, the controller (again by sending the appropriate control signal(s)) may be adapted to increase the pressure in fuel stream 66 by reducing and/or limiting electrical power produced by fuel cell stack 24. This reduction in the consumption of fuel may cause backpressure on fuel stream 66 to increase. This may result in an increase in the pressure of the fuel stream, such as when the production of fuel is ongoing. This in turn, may reduce the error signal on error signal line 128. Therefore, by monitoring the value of this selected variable, namely, the pressure of the hydrogen (or other fuel) stream produced by the fuel processor and consumed by the fuel cell stack, the control system may selectively regulate the control of the fuel cell system while the system is in an active operating state. Expressed in slightly different terms, by monitoring this variable and selectively adjusting or otherwise controlling the operation of the fuel cell system when the value of this variable exceeds (above or below), reaches or approaches one or more selected thresholds, the control system maintains the fuel cell system in an active operating state when otherwise the system might have required transitioning to an idle or even shutdown operating state.

Signal processors 130 and 132 may be adapted to modify the error signal in a manner representative of the desired effect of the error signal on the operation of the associated functional unit. For example, the signal processors may include one or more of a proportioning unit, an integrating unit, and a derivative unit. A proportioning unit may scale the value of the error signal by a particular factor that may be any appropriate value, such as a positive or negative non-zero value, a value less than one, equal to one, or greater than one. An integrating unit may accumulate the error signal over time, so the longer the error signal exists above zero or some reference, the greater the level of the control signal. A derivative unit on the other hand may produce a control signal that is representative of the rate of change of the error signal. In other words, when there is a rapid increase, for instance, in the error signal, then the control signal may be increased accordingly. These and other error signal characteristics may be, in combination, the basis for generating a control signal appropriate for controlling the associated functional unit, optionally based at least in part upon the transfer function of the corresponding functional unit. Optionally, other types of control techniques, such as rule-based control techniques, may also be used.

Figure 4:
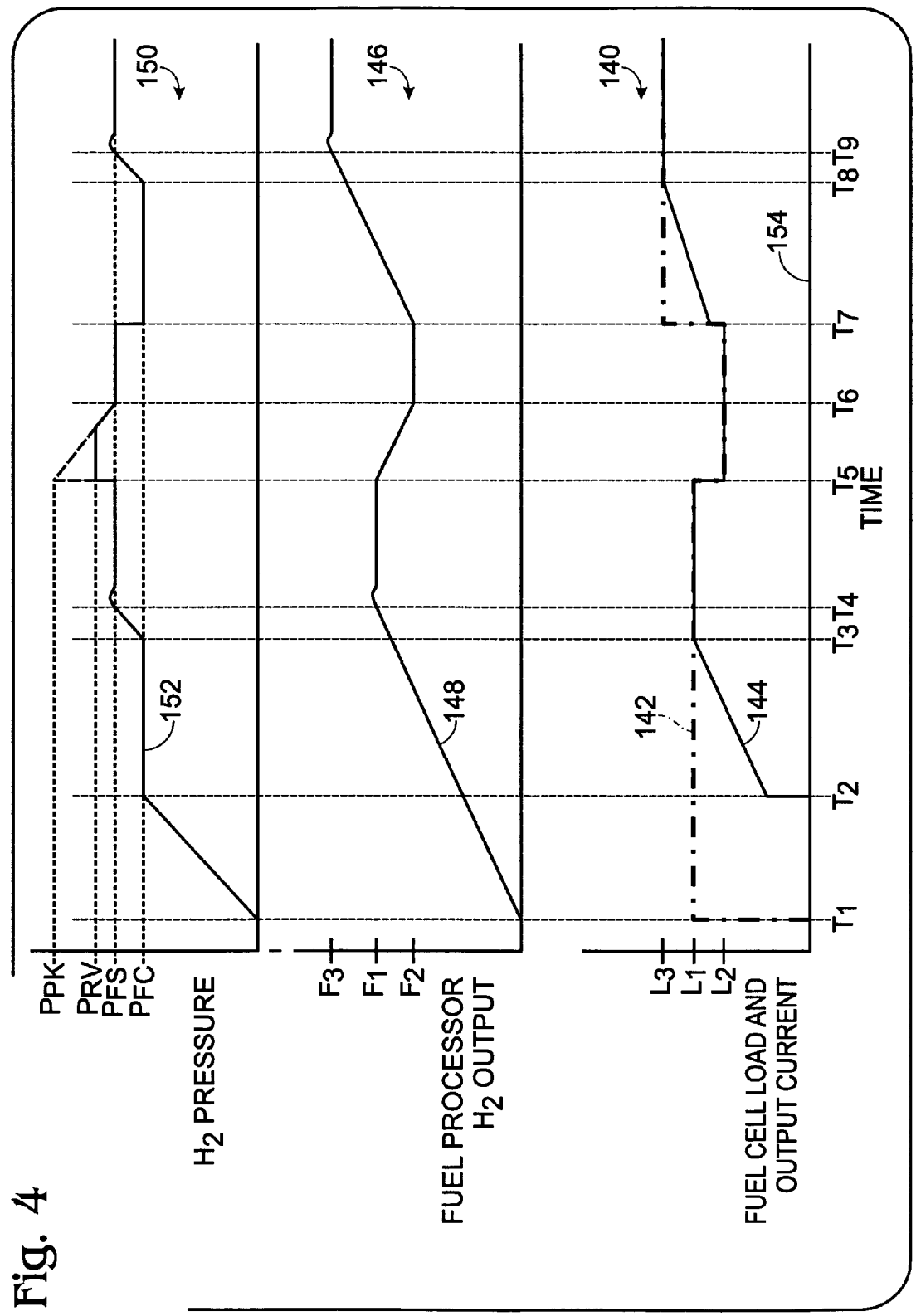
FIG. 4 is an exemplary graph of hydrogen pressure, reformer output, fuel cell stack load, and fuel cell output current for an example of a fuel cell system as shown in FIG. 3.

FIG. 4 depicts exemplary, idealized graphs showing how selected variables of a fuel cell system may vary over time with, or be based on, changes in the load applied to the system. These graphs are presented as illustrative examples only, as actual systems may function differently. A lower graph 140 shows an example of fuel cell stack load 142 and fuel cell stack output electrical current 144 as a function of time. Intermediate graph 146 depicts an example of hydrogen fuel flow 148, as output by a fuel processor 64 as a function of time. Upper graph 150 illustrates an example of the pressure 152 of the hydrogen fuel stream 66 that may result from the operation of a fuel processor and fuel cell stack.

The three graphs have a common time axis 154 that identifies nine points in time, progressing from time $T_1$ through time $T_9$. Initially, the fuel processor and the fuel cell stack may be considered to be in an idle mode, or operating state, where they are ready to respond to an applied load, but are not presently producing (any, or more than a nominal amount of) hydrogen (or other fuel) or an electric current. By "nominal," it is meant the amount (if any) of hydrogen gas (or other fuel) or power required to maintain the fuel cell system in its idle operating state, these requirements being referred to as the balance-of-plant requirements of the system. It is assumed, for purposes of illustration, that little, if any, fuel is being produced by the fuel processor, no current is being produced by the fuel cell stack, and the pressure of any fuel in the fuel stream between the fuel processor and the fuel cell stack is near zero. The graphs shown in FIG. 4 are intended to illustrate how various factors, including changes in the load applied the fuel cell stack and/or system, may affect selected variables of the fuel cell system. The examples depicted in times $T_1$ through $T_9$ are illustrative examples only and are not required to occur in the illustrated sequence.

As schematically illustrated in FIG. 4 at a time $T_1$, an electrical load $L_1$, such as an electrical and/or thermal load, may be applied to the fuel cell system. In response to the load, control system 80 may direct the fuel cell system into an active mode, or operating state, and fuel processor 64 may begin producing hydrogen fuel. This is represented by an increasing level of fuel flow from zero toward flow $F_1$. As fuel stream 66 begins increasing, the pressure of the stream increases accordingly, such as from zero toward a pressure $P_{FC}$. So long as there is insufficient pressure for the fuel cell stack to function safely, no electrical power may be produced. During this time, the applied load may be satisfied by energy-storage device 78 (when present in the fuel cell system).

When there is sufficient fuel flow to produce at least a selected, or threshold, fuel stream pressure $P_{FC}$, the fuel cell stack may begin producing electrical power, as schematically illustrated in FIG. 4 at time $T_2$. Between times $T_2$ and $T_3$, the fuel flow 148 may continue to increase. With increasing fuel flow, the fuel cell stack may be able to produce increasing amounts of electrical power, while keeping the fuel stream pressure at about minimum level $P_{FC}$. In some examples, the fuel cell stack may have a relatively rapid response time, such as less than one second, in responding to a load change compared to the response time of the fuel processor, which may be longer, such as a minute or more. The response, though, may be limited by the requirement that the fuel stream pressure be maintained above the set value of $P_{FC}$. This may produce a relatively constant pressure during this time period.

As schematically illustrated in FIG. 4 at time $T_3$, the fuel cell stack output 144 may reach the applied load 142, with a load level $L_1$, at a fuel flow of less than $F_1$. Since the fuel processor may still be producing additional fuel and the fuel cell stack may be consuming fuel at a relatively constant rate, the fuel stream pressure may continue to rise. However, when the fuel pressure reaches the fuel processor set value of $P_{FS}$, the error signal for the control processor 130 may become negative, and the controller may respond by limiting the rate of production of the fuel stream, such as to a flow $F_1$. At this flow, the consumption by the fuel cell stack may equal production, resulting in the fuel pressure staying at approximately or below pressure $P_{FS}$. There may be, but is not required to be, a nominal overshoot in the value of the pressure above pressure $P_{FS}$, which may be due to a relatively slower response time of the fuel processor. Once the pressure is reduced to below pressure $P_{FS}$, the system generally may stay in this steady state operating condition between times $T_4$ and $T_5$.

As schematically illustrated in FIG. 4 at time $T_5$, the applied load may decrease, such as from load $L_1$ to load $L_2$. The controller may be adapted to respond by decreasing (through the appropriate control signal(s)) the production of electrical power by the fuel cell stack, and thereby the consumption of fuel. This may result in a sudden increase in the pressure of the fuel stream, as shown by the pressure increasing to a new maximum as the fuel processor continues to generate hydrogen gas (or the other fuel which it is adapted to produce). The pressure may continue to increase until it reaches a threshold pressure $P_{RV}$. Pressure $P_{RV}$ represents the release pressure for a relief valve 156 connected to fuel stream 66, as shown in FIG. 3. The relief valve relieves excess pressure, preventing damage that could result if the pressure increased to a higher value, such as represented by a peak value $P_{PK}$, which is shown in dashed lines.

As schematically illustrated in FIG. 4 between times $T_5$ and $T_6$, the applied load may stay constant, but the controller may be adapted to direct the fuel processor to produce continuously less fuel until the fuel stream pressure is brought back to or below pressure $P_{FS}$. As illustrated at time $T_6$, the pressure may reach $P_{FS}$, whereupon the controller may direct the fuel processor to maintain a constant rate of fuel production. Assuming the applied load does not change, the fuel stream pressure should stabilize or otherwise level off. As schematically illustrated in FIG. 4, this new steady-state condition may continue until time $T_7$.

As schematically illustrated in FIG. 4 at time $T_7$, the load 142 may increase to a new, higher level, such as level $L_3$. Due to the quick response of the fuel cell stack relative to the fuel processor, the fuel cell stack output may increase until the pressure in the fuel stream drops to fuel-cell-set value $P_{FC}$ and fuel processor 64 begins producing more fuel. As the fuel flow begins to rise, the fuel cell stack may increase the electrical power produced, keeping the fuel stream pressure at about pressure $P_{FC}$. Again, similar to what occurred during the initial start-up period, a point may be reached at time $T_8$ where the fuel cell production matches the applied load $L_3$. With fuel production still increasing, the fuel stream pressure may rise until it reaches upper limit pressure $P_{FS}$. This may occur at a time $T_9$.

Once pressure $P_{FS}$ is reached, the fuel processor output may stabilize to maintain the fuel pressure at or below pressure $P_{FS}$. This steady-state condition then may continue until a further change in the load occurs.

Fuel cell system 22 thus may provide control of two (or more) system functions that each affects a common variable, which in this example is associated with the fuel stream. The control system 80 also may be adapted to coordinate operation of one or more other functions based at least in part on a different variable, in conjunction with the dual-function, common-variable control just described. An example of such a fuel cell system 22 is illustrated in FIG. 5. For convenience, elements corresponding to elements shown in FIG. 3 have the same reference numbers.

Fuel cell system 22 of FIG. 5 may include a fuel processor 64 that is adapted to produce, such as from at least one feed stream 68, a fuel stream 66 that provides fuel for a fuel cell stack 24. A control system 80 may include a control loop 110 in which the pressure P of the fuel stream is measured by a gauge 116 and communicated to a reference device 118. The difference between the pressure signal and a set value $P_{FS}$ received on a line 122, may be output as an error signal on a line 126. The error signal may be processed by a signal processor 130 to produce a control signal applied on a line 134 to fuel processor 64.

Controller 80 also may include a control loop 112 having a reference device 120 and an error signal processor 132. The error signal on line 128 may be based on the difference between the fuel stream pressure P and the fuel cell set value $P_{FC}$ received on a line 124. However, rather than applying the control signal produced on line 136 directly to the fuel cell stack, the pressure control signal may be applied to a logic unit 160. Logic unit 160, in this example, may be any circuit or device appropriate to select the minimum of two inputs, and to output the minimum on a control line 162 that then may be applied to the fuel cell stack.

In addition to control loops 110 and 112, control system 80 may include additional control loops, such as a third control loop 164. Control loop 164 may provide control of another function of system 22, such as control of fuel cell stack 24 in a manner that maintains the output voltage above a set value, or threshold. This may assist in protecting the fuel cell from damage that may occur during a low voltage condition. Accordingly, control loop 164 may include a voltmeter or other voltage-measuring sensor 166. A voltage sensor output signal may be applied to a voltage signal line 168 that may be applied to a control device, such as to a minus (negative) or inverting input of a third reference device 170. In such an embodiment, the control system (and/or controller) may be described as controlling the operation of the fuel cell system to maintain the pressure of the hydrogen (or other fuel stream) within selected threshold values and to maintain the output voltage from the fuel cell stack above a selected threshold.

As a continuation of this illustrative example, then, a voltage set value $V_{FC}$ may be applied to reference device 170 on a reference signal line 172. The resulting error signal may be transmitted to a signal processor 174 on an error signal line 176. The signal processor may process the signal, as described for signal processors 130 and 132, as appropriate for the desired control response desired, and produce a voltage control signal on a control signal line 178. The control signal line may transmit the voltage control signal to logic unit 160. As mentioned above, the lower of the voltage and pressure inputs may be selected and output on fuel cell stack control line 162 for controlling operation of the fuel cell stack. Optionally, similar techniques may be used to control other system parameters, such as temperature.

Illustrative, non-exclusive descriptions of aspects of the fuel cell system presented herein are presented below. For example, control system 80 may be adapted to detect a system variable, to control operation of at least one system component in a manner adapted to maintain the variable above a first value, and/or to control operation of at least another of the components in a manner adapted to maintain the variable below a second value greater than the first value. As discussed above, in some examples, one component may include a fuel source and the other component may include a fuel cell stack, and a common variable may be the pressure of fuel supplied by the fuel source to the fuel cell stack. The controller may be adapted to detect the fuel pressure and to control the fuel source and the fuel cell stack in a manner adapted to maintain the pressure in a range of values. As discussed, the fuel source may include or be a fuel processor that is adapted to produce the fuel, which may be hydrogen gas.

In some examples, control system 80 may be adapted to detect the pressure of a fuel stream produced by a fuel processing assembly, and to control production of the fuel stream by the fuel processing assembly to maintain the pressure of the fuel stream below a selected value, or threshold. In some examples, the control system may be adapted to control production of electrical power by the fuel cell stack, such as by control of electrical current, to maintain the pressure of the fuel stream above a second value or threshold. In some examples, control system 80 may be adapted to control consumption of the fuel by the fuel cell stack to maintain a voltage of the electrical power produced by the fuel cell stack. In some examples, the fuel source may include a fuel processor adapted to produce the fuel from one or more feedstocks, and the controller may be adapted to control use of the feedstocks by the fuel processor based at least in part on the fuel pressure.

FIG. 6 schematically depicts a fuel cell system 22 that includes a fuel cell assembly 83 with at least a first functional component 90 and a second functional component 92. As depicted, component 90 is adapted to receive an input variable 94 and to produce an intermediate variable 96. Second functional component 92 is adapted to receive intermediate variable 96 as an input and to produce an output variable 98. The value of intermediate variable 96 may be dependent, at least in part, upon the function of component 90 and the function of component 92. System 22 may have additional functions and/or additional functional components that also affect the value of a common variable, such as intermediate variable 96. Also shown in FIG. 6 is a control system 80 that is adapted to detect the value of variable 96, such as directly or via one or more appropriate communication links, such as a communication link 100. The control system may also be adapted to control the related functions, such as the function of component 90 via an appropriate communication link 102, and the function of component 92 via an appropriate communication link 104.

As discussed above with respect to FIGS. 3 and 5, first component 90 may include a fuel source 46, and second component 92 may include a fuel cell stack 24. Input variable 94 may then correspond to a feed stream 68, intermediate variable 96 may correspond to a fuel stream 66, and output variable 98 may correspond to output electrical power 79. In such an example, the pressure of fuel stream 66 may be based at least in part on the flow of fuel from fuel source 46, and the consumption of fuel by fuel cell stack 24. Other examples may also be used. However, FIG. 6 is intended to schematically represent that this assignment is not required and that other variables and/or first and second functional components may be utilized with the variable-based control system described herein.

INDUSTRIAL APPLICABILITY

Fuel cell systems and control systems described herein may be applicable in any situation where power is to be produced by one or more fuel cells, such as in a fuel cell stack. Such systems may be particularly applicable when the fuel cell stack forms part of a fuel cell system that includes a fuel source, such as a fuel processing assembly, that provides a fuel stream for the fuel cell stack.

The automation of fuel cell system 22 may enable it (but does not require it) to be used in households, vehicles and other commercial applications where individuals that are not trained in the operation of fuel cell systems use the system. It also may enable use in environments where technicians, or even other individuals, are not normally present, such as in microwave relay stations, unmanned transmitters or monitoring equipment, etc. Control system 80 also may enable the fuel cell system to be implemented in environments where it is impracticable for an individual to be constantly monitoring the operation of the system. Instead, the user may be able to rely upon the control system to regulate the operation of the fuel cell system, with the user only requiring notification if the system encounters operating parameters and/or conditions outside of the control system's range of automated responses.

The above examples illustrate possible applications of such an automated fuel cell system, without precluding other applications or requiring that a fuel cell system necessarily be adapted to be used in any particular application. Furthermore, in the preceding paragraphs, control system 80 has been described controlling various portions of the fuel cell system. The system may be implemented without including every aspect of the control system described above. Similarly, system 22 may be adapted to monitor and control operating parameters not discussed herein and may send command signals other than those provided in the preceding examples.

It is believed that the disclosure set forth above encompasses multiple distinct methods and/or apparatus with independent utility. While each of these methods and apparatus has been disclosed in its preferred form, the specific examples thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. Further, cardinal indicators, such as first, second or third, such as for identified elements or values, are used to distinguish between the elements, and do not indicate a required or limited number of such elements, nor does it indicate a particular position or order of such elements unless otherwise specifically stated.

It is believed that the following claims particularly point out certain combinations and subcombinations that correspond to the disclosed examples and are novel and nonobvious. Other combinations and subcombinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

It is claimed:

1. A fuel cell system, comprising:
    a fuel cell assembly including a fuel source and a fuel cell stack that receives oxidant and a fuel stream from the fuel source and which produces electrical output therefrom, wherein the fuel cell assembly includes a plurality of components having respective functions, the components operating in a manner that controls a pressure of the fuel stream; and
    a control system programmed to selectively control at least the rate of delivery of the fuel stream to the fuel cell stack directly responsive to the pressure of the fuel stream and to selectively control the rate of production of electrical output directly responsive to the pressure of the fuel stream.

2. The fuel cell system of claim 1, wherein the fuel stream includes hydrogen gas.

3. The fuel cell system of claim 2, wherein the control system is programmed to control the rate of delivery of the fuel stream to the fuel cell stack and the rate of consumption of the fuel stream by the fuel cell stack to maintain the pressure of the fuel stream between first and second threshold values.

4. The fuel cell system of claim 1, wherein the fuel source includes a fuel processor that produces the fuel stream from at least one feedstock.

5. The fuel cell system of claim 4, wherein the control system is programmed to control the rate of production of the fuel stream and the rate of consumption of the fuel stream by the fuel cell stack to maintain the pressure of the fuel stream between first and second threshold values.

6. The fuel cell system of claim 4, wherein the fuel stream includes hydrogen gas.

7. The fuel cell system of claim 6, wherein the fuel processor produces the fuel stream by reforming water and at least one carbon-containing feedstock.

8. The fuel cell system of claim 6, wherein the fuel source further includes at least one separation assembly that reduces the concentration of at least one impurity in the fuel stream.

9. The fuel cell system of claim 1, wherein the control system is programmed to control the consumption of the fuel stream by the fuel cell stack by controlling the electrical output produced by the fuel cell stack.

10. The fuel cell system of claim 9, wherein the fuel cell stack produces the electrical output at a voltage, and the control system is further programmed to control consumption of the fuel stream by the fuel cell stack to maintain the voltage above a threshold voltage.

11. The fuel cell system of claim 4, wherein the control system is programmed to control consumption of the at least one feedstock by the fuel processor based on the pressure of the fuel stream.

12. The fuel cell system of claim 11, wherein the control system is further programmed to control consumption of the fuel stream by the fuel cell stack based on the pressure of the fuel stream.

13. The fuel cell system of claim 1, wherein the fuel source includes at least one hydrogen-storage device.

14. An energy-producing and consuming assembly comprising:
    a fuel cell system according to claim 3; and
    at least one energy-consuming device that exerts an applied load on the fuel cell system.

15. An energy-producing and consuming assembly comprising:
    a fuel cell system according to claim 2; and
    at least one energy-consuming device that exerts an applied load on the fuel cell system.

16. An energy-producing and consuming assembly comprising:
    a fuel cell system according to claim 1; and
    at least one energy-consuming device that exerts an applied load on the fuel cell system.

17. The fuel cell system of claim 9, wherein the system further includes at least one energy-consuming device that exerts an applied load on the fuel cell system, and further wherein controlling the electrical output produced by the fuel cell stack includes controlling the applied load.

18. The fuel cell system of claim 17, wherein the system further includes a load-regulating device adapted to control the applied load.

* * * * *